June 26, 1956  R. C. GAUGER  2,752,081
PRESSURE MONITORING ASSEMBLY FOR EVACUATING APPARATUS
Filed July 26, 1952
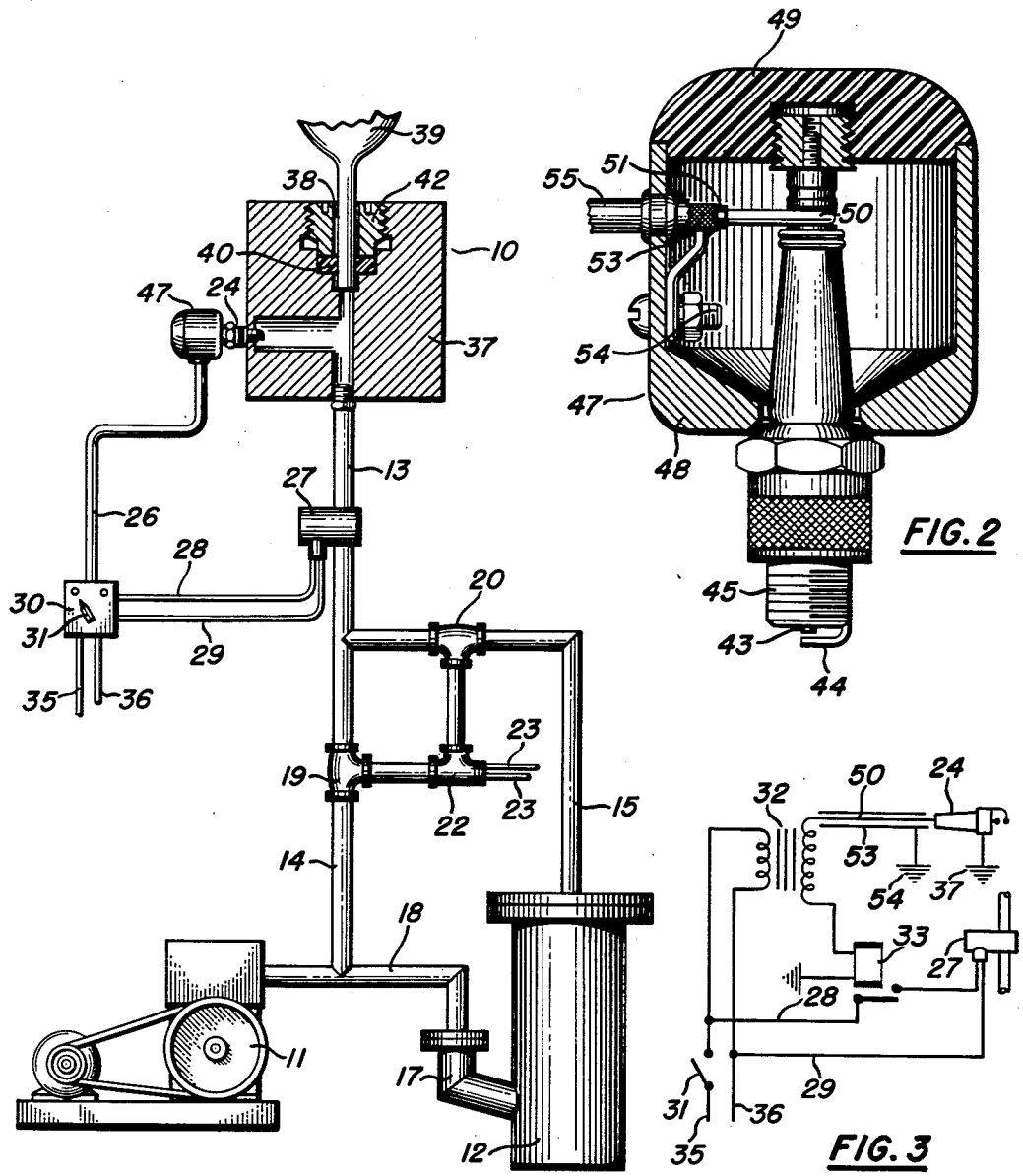
ROY C. GAUGER
INVENTOR.
BY
ATTORNEYS

United States Patent Office 2,752,081
Patented June 26, 1956

2,752,081

PRESSURE MONITORING ASSEMBLY FOR EVACUATING APPARATUS

Roy C. Gauger, Rochester, N. Y., assignor, by mesne assignments, to Consolidated Electrodynamics Corporation, Pasadena, Calif., a corporation of California Application July 26, 1952, Serial No. 301,101

4 Claims. (Cl. 226—20.4)

This invention relates to evacuating apparatus including pressure monitoring means for detecting leaks.

Many common articles such as cathode ray tubes, X-ray tubes, magnetron tubes, Thermos bottles and the like depend for successful performance upon being evacuated under high vacuum. Many processes such as vacuum coating with metals by thermal evaporation, high vacuum distillation, vacuum dehydration and the like also are carried out under high vacuum.

The degree of vacuum being attained is ordinarily measured by means of any of the well-known vacuum gauges including ionization gauges, Pirani gauges, McLeod gauges or the like where an exact pressure measurement is needed. Such gauges are relatively complex and costly, however; and in many cases, particularly with mass produced evacuated articles, the pumping characteristics of the vacuum pumping system is known and the pumping proceeds on a time cycle with no exact pressure measurements being made during evacuation.

It is desirable, however, to have some simple and relatively inexpensive means for monitoring the evacuation periodically to be certain that leaks have not occurred. This is important not only from the standpoint of quality control on the articles being evacuated, but also to obviate the deleterious effects which result from exposing a heated oil diffusion pump to pressures approaching atmospheric pressure. In the case of high vacuum evacuation, the pressure desired will be below 100 microns Hg and usually of the order of 1 micron Hg or less. A defective article being evacuated, such as a defective tube, or other source of leakage will ordinarily result in pressures well above this range and usually of the order of from 300 microns up to atmospheric pressure. Pressures above about 300 microns also have a harmful effect on the oil diffusion pumps. It is therefore desirable to have some simple means for spot checking as to whether the pressure is in the desired high vacuum range or only in the range of the mechanical roughing pump.

It is accordingly an object of this invention to provide simple but effective monitoring means for spot checking the pressure in evacuated systems.

It is a further object of this invention to provide evacuating apparatus including control means for determining whether or not objectionable leakages are occurring.

It is another object of the invention to provide evacuating apparatus including means for safeguarding the diffusion pump from prolonged exposure to pressures above the normal operating range of such pump.

Another object of the invention is to provide evacuating apparatus including new and improved means for periodically checking the pressure range and for automatically or continuously interrupting the evacuation if too high a pressure is found.

Another object of the invention is to provide pressure monitoring means operable to energize a suitable safety device if the pressure is above about 300 microns and which gives no response if the pressure is below about 300 microns.

Other objects will be apparent from the drawings and from the description and claims which follow.

These and other objects are attained in accordance with this invention as described more fully hereinafter with particular reference to the drawings.

Of the drawings:

Fig. 1 is a view in elevation, partly broken away and in section, of evacuating apparatus illustrating a typical embodiment of the invention;

Fig. 2 is an enlarged fragmentary view, partly broken away and in section, of a portion of the pressure monitoring assembly included in the evacuating apparatus illustrated by Fig. 1; and Fig. 3 is a circuit diagram of a pressure monitoring assembly embodying the invention.

In general, apparatus embodying this invention comprises the combination with evacuating apparatus, of a pressure monitoring assembly which includes a spark plug mounted on the evacuating apparatus, a power lead arranged to energize the spark plug with high voltage current, either continuously or intermittently as desired, and a vacuum controlling device connected in the circuit with the spark plug and operable in response to current discharge from firing of the spark plug.

I have found that a conventional spark plug such as those used in gasoline engines will furnish sufficient discharge current over the entire pressure range from about 300 microns to atmospheric pressure to actuate a relay connected into a controller circuit, whereas at lower pressures, the spark plug does not fire. Therefore, the monitoring assembly embodying the invention is very effective for providing automatic control between the mechanical pump range of from about 300 microns to atmospheric pressure and the high vacuum pump range below 300 microns. The control means actuated in response to discharge current from firing of the spark plug can be any conventional warning control, but preferably is a pumping control such as a solenoid control for isolating the entire pumping system or for switching the pumping system onto only the mechanical pump at pressures above 300 microns or for shutting off the pumps or otherwise interrupting the evacuation.

The spark plug employed is a conventional spark plug which desirably has an electrode gap of not more than 0.005 inch and which is energized by an applied voltage of at least 2000 volts. At pressures from about 300 microns up to pressures approaching atmospheric pressure, the plug appears to fire by current discharge from the center electrode to the plug shell. At higher pressures, the discharge current is produced by firing across the electrode gap, which permits continuous control over the entire range from 300 microns to atmospheric pressure. The intensity of the current discharge from the center electrode to the shell rises rapidly above 300 microns and then falls rapidly at pressures approaching atmospheric but this range is overlapped by the discharge across the electrode gap which rises in intensity as the previous discharge decreases and assumes a steady value up to atmospheric pressure and above.

The utility of the pressure monitoring system embodying this invention becomes apparent when it is considered that the response is practically instantaneous and is dependent upon the pressure in the system and not upon activation by a tracer gas or similar means, as is common in leak detector assemblies. Thus there is no induction period or purging period necessary in the operation of the apparatus embodying the invention. The apparatus is specifically designed for pressure range control and while it indicates leakage, it is not intended for use in determining the site of leakage or the absolute pressure in the system except as to whether it is within or outside a particular pressure range.

A typical embodiment of the invention with a pressure monitoring assembly mounted on evacuating apparatus is illustrated in the drawings. The apparatus shown is apparatus particularly adapted for evacuating hollow articles, such as tubes, bulbs, Thermos bottles or similar articles which have a neck portion which is tipped off following evacuation. In the preferred embodiment illustrated by the drawings and with particular reference to Fig. 1, a vacuum pumping system consisting of a mechanical pump 11 and a high vacuum diffusion pump 12 is connected to a vacuum port 10 by means of a branched primary conduit 13, one branch 14 of conduit 13 being connected to the intake end of the mechanical pump 11 and the other branch 15 of conduit 13 being connected to the intake end of diffusion pump 12. The outlet arm 17 of diffusion pump 12 is connected to the intake end of mechanical pump 11 by exhaust conduit 18, whereby the mechanical pump 11 can serve both as roughing pump during initial evacuation and as a backing pump during high vacuum evacuation. Valves 19 and 20 mounted in conduit branches 14 and 15 and actuated by solenoid 22 serve to direct the exhaust gases directly through the mechanical pump 11 during the rough pumping operation, with the diffusion pump isolated from the excessive pressure, and then directing the exhaust through the diffusion pump 12 and thence through the mechanical pump 11 during the high vacuum evacuation. Solenoid 22 is provided with current leads 23, 23 connected into a suitable circuit for actuating the solenoid at the desired periods during the evacuating cycle.

Mounted on the evacuating apparatus for operation in combination therewith is a pressure monitoring assembly, which in the preferred embodiment shown in the drawings, comprises a spark plug 24 which is mounted on the side of vacuum port 10 with the base of the plug projecting into the evacuable space within the port, a power lead 26 for energizing the plug and a solenoid valve 27 mounted in the primary conduit 13 between the vacuum port 10 and the pumps 11 and 12. The electrical leads 28 and 29 for solenoid valve 27 are connected into the spark plug circuit at control box 30 which contains a power switch 31, high voltage transformer 32 and relay 33 as shown particularly in Fig. 3 of the drawings and described more fully hereinafter. Leads 35 and 36 from control box 30 are adapted to connect the pressure monitoring assembly circuit into a conventional 110 volt electrical circuit.

Referring more particularly to Fig. 1, the vacuum port comprises a hollow metal exhaust head 37 having an exhaust socket 38 adapted to receive the neck of a cathode ray tube 39 or similar article to be evacuated. The exhaust socket 38 includes the usual deformable rubber gasket 40 and a slotted screw cap 42 for compressing gasket 40 into vacuum-tight engagement with the neck of the tube 39 or other article to be evacuated.

Referring particularly to Fig. 2, the spark plug 24, which is of conventional design, is mounted on the side of exhaust head 37 with the center electrode 43 and opposed electrode 44 in the interior of head 37 and the metal shell 45 on the base of plug 24 grounded to the metal exhaust head 37. Because of the high voltage current employed, plug 24 is housed within cap housing 47 consisting of a metal box 48 and a removable insulating cover 49. Power lead 26 from control box 30 enters housing 47 through wall 48 and is connected to the center electrode 43 of the spark plug 24. Desirably, power lead 26 has the current-bearing wire core 50 embedded in plastic insulation 51 which in turn is enveloped by a braided copper shield sleeve 53 grounded to housing 47 and thence to exhaust head 37 by connection with post 54. The metal sleeve shield 53 in turn is covered with the usual insulating cable covering 55.

In the preferred embodiment, with particular reference to Fig. 3, the current inlet lead 35 connected to the power source is provided with a cut-off switch 31 at control box 30. High voltage transformer 32 and relay 33 for solenoid valve 27 are connected into the monitoring circuit in parallel, with transformer 32 being adapted to step up the voltage of current supplied to plug 24 to at least 2000 volts and relay 33 being arranged to actuate solenoid valve 27 when spark plug 24 fires.

In operating the apparatus illustrated in the drawings, the neck of a tube 39 or similar article to be processed is inserted into exhaust socket 38 and screw cap 42 is turned down to compress gasket 40 around the tube neck. In the embodiment shown in the drawings, switch 31 in the pressure monitoring assembly is open throughout the first part of the evacuating cycle. The valve 20 in the inlet conduit 15 to the diffusion pump 12 is closed and the valve 19 in the inlet conduit 14 for the mechanical pump 11 is opened by operation of solenoid 22 which is actuated from suitable manual or automatic controls (not shown). The pumps 11 and 12 are started, and rough pumping of the tube 39 proceeds through the mechanical pump 11. After a predetermined time, solenoid 22 is again actuated to close valve 19 and open valve 20 so that high vacuum evacuation proceeds through diffusion pump 12 and thence through mechanical pump 11 which now serves as a backing pump.

As the high vacuum pumping begins or shortly thereafter, switch 31 is closed to energize spark plug 24 with an applied voltage in excess of 2000 volts. If the pressure in the vacuum port is below about 300 microns Hg, the spark plug does not fire and the pumping continues. When the tube being evacuated is defective, however, so that the pressure has not fallen below about 300 microns, the spark plug fires. Since the plug is grounded to the exhaust head 37 and thence through conduit 13, firing of the plug completes the circuit, relay 33 is actuated, and current is supplied to solenoid valve 27. Solenoid valve 27 closes conduit 13, thus isolating the pumps 11 and 12 from the vacuum port 10 so that evacuation through port 10 is interrupted and damage to the diffusion pump is obviated.

Plug 24 fires either from the center electrode 43 to the shell 45 or to the opposed electrode 44 depending upon the pressure in the port, the electrode gap being about 0.005 inch for best firing at atmospheric pressure. The plug 24 is energized for only a short period of time or throughout the high vacuum pumping cycle as desired. The insulating cover 49 on housing 47 affords protection against the high voltage current. Further protection is provided by the braided sleeve 53 on power lead 25 which is grounded at 54 to the wall 48 of cap housing 47 so that, in the event that the wire core 50 is broken, the current will be grounded through shield sleeve 53.

Thus, by means of this invention, a simple but effective pressure monitoring assembly for use in combination with evacuating apparatus is provided. The apparatus embodying the invention provides a positive and instantaneous response to pressures above the desired high vacuum range, and incorporates positive vacuum control means directly responsive to firing of the spark plug at pressures above 300 microns. The pressure monitoring assembly is adapted for use in combination with any of the various evacuating apparatus and utilizes any well-known electrically energizable control devices depending upon the control desired in the event of improper evacuation.

Although the invention has been described in considerable detail with reference to a preferred embodiment thereof, it will be understood that variations and modifications can be effected within the spirit and scope of the invention as illustrated in the drawings and described hereinabove and as defined in the appended claims.

I claim:

1. Evacuating apparatus comprising in combination an evacuating system including a vacuum port adapted to engage an article to be evacuated and vacuum pumping means connected to said vacuum port, a spark plug mounted on said evacuating system and having the base portion of said spark plug projecting into the interior of said evacuating system, the base portion of said spark plug including an elongated center electrode and a conductive shell disposed around the electrode, the shell having an opposing electrode extending toward the center electrode, means for applying a voltage to the two electrodes, and means operable in response to discharge current across the electrodes for interrupting the evacuation through said port.

2. Evacuating apparatus comprising in combination a vacuum port adapted to engage an article to be evacuated, vacuum pumping means connected to said vacuum port and including a high vacuum diffusion pump and a backing pump, a spark plug mounted on said vacuum port and having the base portion of said spark plug projecting into the interior of said vacuum port, the base portion of said spark plug including an elongated center electrode and a conductive shell disposed around the electrode, the shell having an opposing electrode extending toward the center electrode, means for applying a voltage to the two electrodes during the high vacuum pumping cycle, and means operable in response to discharge current from said two electrodes for isolating said vacuum port from said vacuum pumping means.

3. Apparatus comprising in combination an evacuating system and pressure guard means, said evacuating system comprising a vacuum port, vacuum pumping means and conduit means connecting said vacuum pumping means with said vacuum port, said pressure guard means comprising a spark plug mounted on said evacuating system and having the base portion of said spark plug projecting into said evacuating system, the base portion of said spark plug including an elongated center electrode and a conductive shell disposed around the electrode, the shell having an opposing electrode extending toward the center electrode, means for applying a voltage to the two electrodes during a predetermined period in the evacuating cycle of said apparatus, and solenoid valve means connected with the two electrodes and arranged for closing said conduit means between said vacuum port and said vacuum pumping means in response to discharge current across the two electrodes.

4. In combination, a vacuum port adapted to receive the neck portion of an article to be evacuated, a mechanical vacuum pump, a diffusion pump, branched primary conduit means connecting said vacuum port with the intake end of said mechanical pump and with the intake end of said diffusion pump, secondary conduit means connecting the exhaust end of said diffusion pump with the intake end of said mechanical pump, a spark plug mounted on said vacuum port with the base portion of said spark plug projecting into the interior of said vacuum port, said spark plug having an electrode gap of substantially 0.005 inch, means for energizing said spark plug and including means for supplying current at a voltage in excess of 2000 volts to said spark plug and switch means for interrupting flow of current to said spark plug, and solenoid valve means in said primary conduit means and arranged to close in response to firing of said spark plug.

References Cited in the file of this patent

UNITED STATES PATENTS

| | | |
|---|---|---|
| 1,566,279 | King | Dec. 22, 1925 |
| 1,716,155 | Smede | June 4, 1929 |
| 1,933,322 | Fagan | Oct. 31, 1933 |

FOREIGN PATENTS

| | | |
|---|---|---|
| 397,440 | France | Feb. 25, 1909 |